(12) United States Patent
Shepherd

(10) Patent No.: US 6,419,096 B1
(45) Date of Patent: Jul. 16, 2002

(54) STORAGE RACK FOR BICYCLES

(75) Inventor: Shaun D. Shepherd, Portland, OR (US)

(73) Assignee: University of Portland, Portland, OR (US)

( * ) Notice: Subject to any disclaimer, the term of this patent is extended or adjusted under 35 U.S.C. 154(b) by 0 days.

(21) Appl. No.: 09/689,227

(22) Filed: Oct. 11, 2000

Related U.S. Application Data (60) Provisional application No. 60/159,010, filed on Oct. 11, 1999.

(51) Int. Cl.[7] .................................................. A47F 7/00
(52) U.S. Cl. .......................................... 211/18; 211/22
(58) Field of Search ............................... 211/17–20, 22, 211/23, 24, 181.1, 63, 70.6, 5, 70.5; 248/153, 175, 536, 534; D12/115

(56) References Cited

U.S. PATENT DOCUMENTS

| | | | | | |
|---|---|---|---|---|---|
| 481,751 | A | * | 8/1892 | Engler | 211/18 |
| 512,548 | A | * | 1/1894 | Hurlbut | 211/18 |
| 605,429 | A | * | 6/1898 | Howard | 211/18 |
| 626,535 | A | * | 6/1899 | Gradmiller | 211/18 |
| D36,091 | S | * | 9/1902 | Merritt | |
| 1,202,444 | A | * | 10/1916 | Soleau | 211/17 |
| 3,202,289 | A | * | 8/1965 | Burditt | 211/17 |
| 3,335,871 | A | * | 8/1967 | Crisman | 211/18 |
| 3,603,459 | A | * | 9/1971 | Erb | 211/20 |
| 3,786,928 | A | * | 1/1974 | Johnson | 211/22 |
| 3,794,227 | A | * | 2/1974 | Stearns | 224/42.01 |
| 3,865,244 | A | * | 2/1975 | Galen et al. | 211/24 |
| 3,887,075 | A | * | 6/1975 | Harvey | 211/22 |
| 3,918,279 | A | * | 11/1975 | Williamson | 211/20 |
| 3,964,611 | A | * | 6/1976 | Galen et al. | 211/22 |
| 4,015,718 | A | * | 4/1977 | Bernard | 211/17 |
| 4,047,614 | A | * | 9/1977 | Radek | 211/17 |
| 4,182,454 | A | * | 1/1980 | Tohms | 211/17 |
| 4,306,660 | A | * | 12/1981 | Livingston | 211/20 |
| 4,352,432 | A | * | 10/1982 | Smith | 211/19 |
| 4,433,787 | A | * | 2/1984 | Cook et al. | 211/20 |
| 4,524,893 | A | * | 6/1985 | Cole | 224/319 |
| 4,552,270 | A | * | 11/1985 | Lentz et al. | 211/17 |
| 4,555,029 | A | * | 11/1985 | Fiol | 211/22 |
| D295,030 | S | * | 4/1988 | Wahl | D12/115 |
| 5,096,068 | A | * | 3/1992 | Theriault | 211/22 |
| D330,695 | S | * | 11/1992 | Simmons | 211/20 |
| 5,201,426 | A | * | 4/1993 | Cruwell, Jr. | 211/17 |
| 5,238,125 | A | * | 8/1993 | Smith | 211/19 |
| 5,323,915 | A | * | 6/1994 | Fortune, Sr. et al. | 211/22 |
| D353,353 | S | * | 12/1994 | Katsaros | D6/552 |
| 5,417,629 | A | * | 5/1995 | Phipps | 211/22 |
| D369,131 | S | * | 4/1996 | Smith | 211/20 |
| 5,544,763 | A | * | 8/1996 | McClain | 211/22 |
| 5,549,231 | A | * | 8/1996 | Fletcher et al. | 224/536 |
| 5,642,820 | A | * | 7/1997 | Angeles | 211/18 |
| 5,743,411 | A | * | 4/1998 | Hawkes | 211/20 |
| 5,788,092 | A | * | 8/1998 | Teeney | 211/70.6 |
| 5,794,793 | A | * | 8/1998 | Frederick | 211/20 |
| 5,862,921 | A | * | 1/1999 | Venegas, Jr. | 211/17 |
| 6,053,337 | A | * | 4/2000 | Venegas, Jr. | 211/22 |
| 6,216,882 | B1 | * | 4/2001 | Strunck et al. | 211/18 |

* cited by examiner

Primary Examiner—Daniel P. Stodola
Assistant Examiner—Jennifer E. Novosad
(74) Attorney, Agent, or Firm—Klarquist Sparkman, LLP

(57) ABSTRACT

A bicycle storage rack has substantially straight, horizontally extending upper and lower anchoring members that extend generally parallel to one another and are secured to building members such as a floor, wall or ceiling. A row of vertically extending bicycle support members are connected to the upper and lower anchoring members with the support members being spaced apart from one another to provide a series of bicycle receiving gaps therebetween. Hangers or hooks are provided on at least some of the bicycle support members to support bicycles, hung by a wheel rim, at an elevation above the floor.

5 Claims, 7 Drawing Sheets

STORAGE RACK FOR BICYCLES

This claims the benefit of U.S. Provisional Application No. 60/159,010, filed Oct. 11, 1999.

The present invention concerns racks for temporarily storing multiple bicycles.

Bicycle storage racks are common fixtures of school campuses, office buildings, and bicycle shops where bicycles need to be stored on either a temporary or semi-permanent basis.

Although a wide variety of bicycle racks have been used in the past, many have failed to maximize the use of storage space or are overly complex in design.

The present invention concerns bicycle storage racks that comprise plural elongate bicycle support members connected to upper and lower anchoring members. Each anchoring member is secured to a building element such as a floor, wall or ceiling. Hangers are provided at or near the top of some or all of the bicycle support members so that a bicycle either can be hung from a hanger or can be locked to a vertical portion of the support members while resting with its tires on the ground. Features and advantages of bicycle racks according to the present invention will be understood with reference to the accompanying detailed description and drawings.

DETAILED DESCRIPTION

Figure 1:
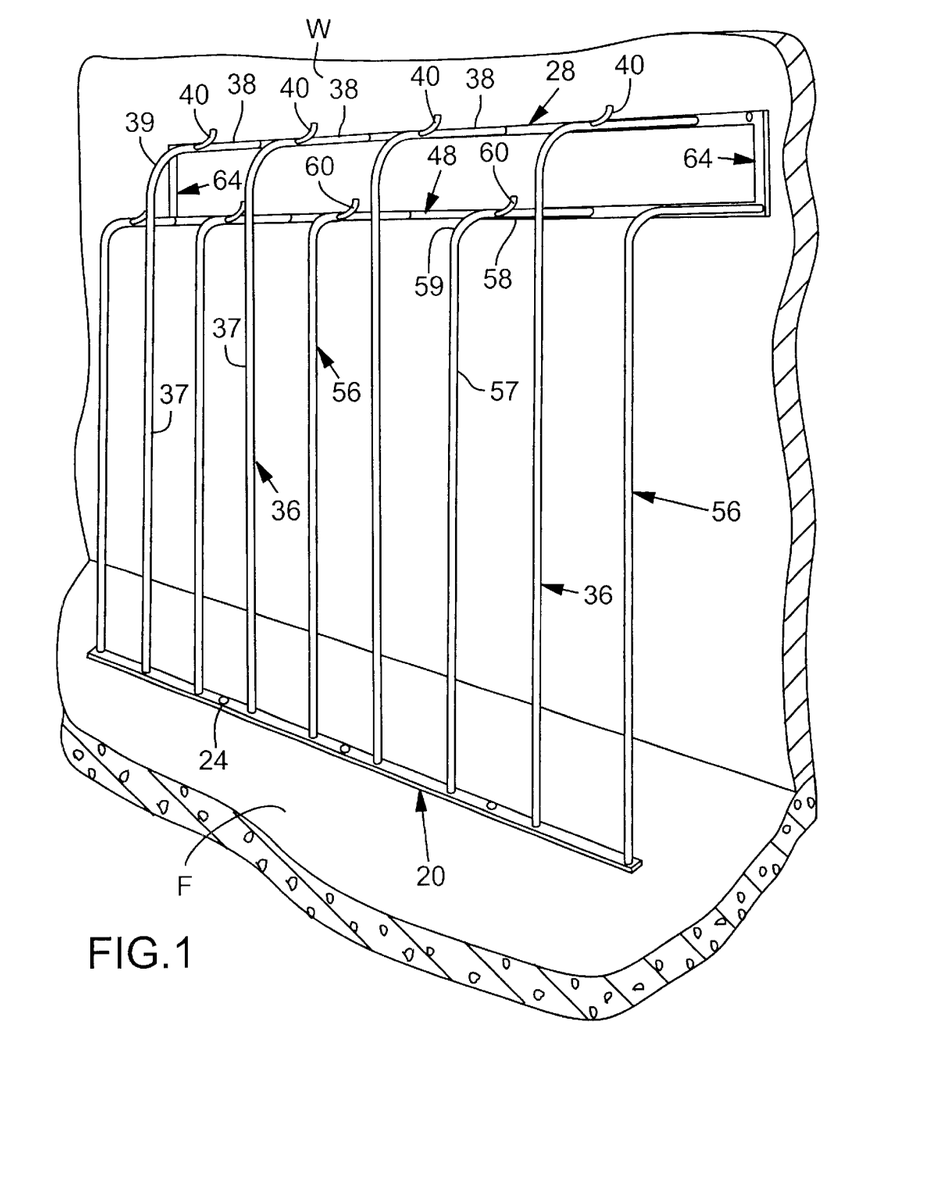
FIG. 1 is a perspective view of a first bicycle storage rack according to the present invention.
Figure 2:
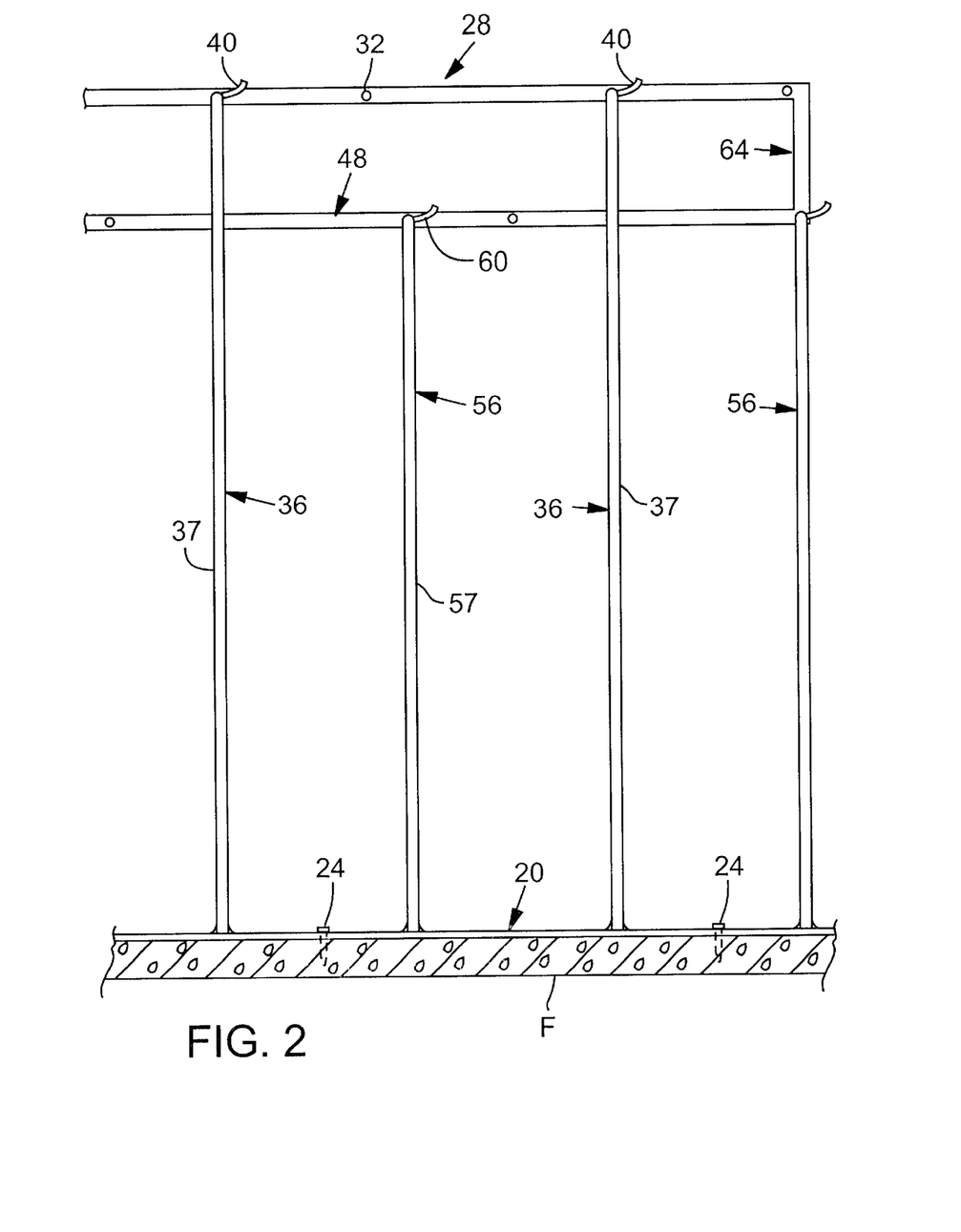
FIG. 2 is a front view of the rack shown in FIG. 1.
Figure 3:
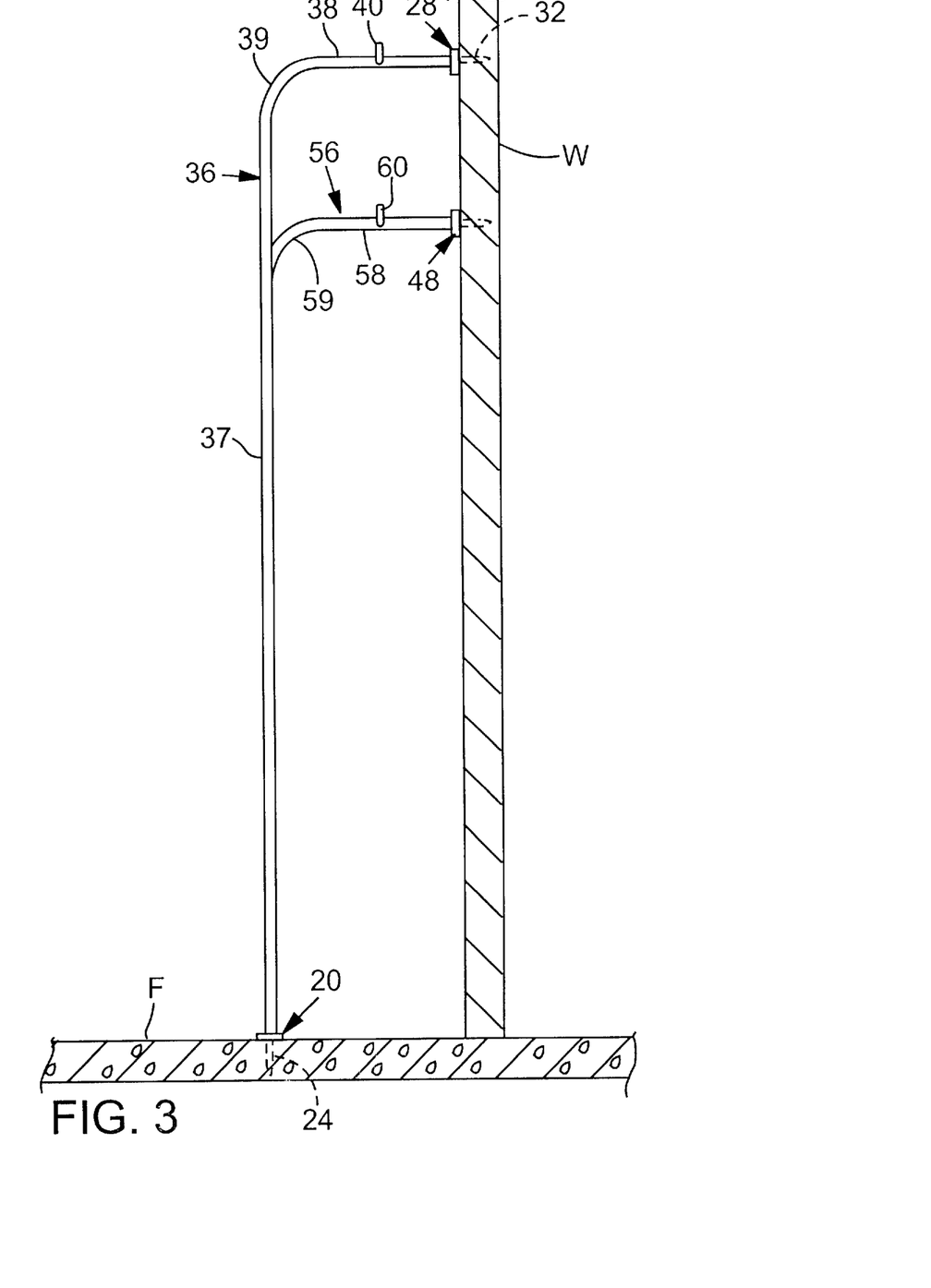
FIG. 3 is a right side view of the rack shown in FIG. 1.

FIGS. 1–3 show a first embodiment of a bicycle rack according to the present invention. In this embodiment the storage rack has a substantially straight, horizontally extending lower anchoring member 20 which is a steel flat bar, such as ⅛×2 inch or ⅛×1½ inch steel flat bar, mounted to the floor F of the building by means of fasteners 24. The fasteners can be lag screws, concrete bolt and anchor fasteners or other fasteners appropriate for the material from which the floor is made. The lower anchoring member 20 could be connected by fasteners molded in place into a concrete floor or the lower anchoring member 20 itself could be embedded into a concrete floor prior to curing.

At the top of the rack is a substantially straight, horizontally extending upper anchoring member 28 which, for example, can be steel flat bar, such as ⅛×2 inch or ⅛×1½ inch steel flat bar, or angle iron, such as ⅛×1½×1½ inch angle iron. The upper anchor member 28 is secured to a wall W of the building by fasteners 32. The upper anchoring member 28 extends substantially parallel to the lower anchoring member 20 and is at an elevation above the lowering anchoring member. As best can be seen in FIG. 3, the upper anchoring member 28 is laterally offset from the lower anchoring member 20.

Plural elongate upper bicycle support members 36 extend between the lower and upper anchoring members 20, 28 with the support members spaced apart from one another to provide a series of support members 36 in a row with bicycle-receiving gaps therebetween. A bicycle hanger or hook 40 is provided on at least some of the bicycle support members 36. In most installations it is best to provide one hook per support member 36, but in some instances a support member could bear more than one hook. Advantageously the hooks 40 are located at a sufficient elevation above the floor F that, when a bicycle wheel is hung from a hanger 40 with a rim resting on the hanger, the bicycle does not touch the floor. In other words, the hangers should be at an elevation above the floor that is no less than the length of bicycles to be hung on the hangers 40.

Each of the illustrated support members is a generally L-shaped steel tube that has a substantially vertically extending portion 37 and a substantially horizontally extending portion 38 connected by a curved portion 39. The tubing used for the illustrated support members has a 1¼ inch outside diameter and a ⅛ inch wall thickness. A hanger 40 is welded to each support member.

The embodiment of FIGS. 1–3 also includes a substantially straight horizontally extending intermediate anchoring member 48. The intermediate anchoring member, which also is a steel flat bar or angle iron, extends substantially parallel to the upper anchoring member 28 and is at an elevation between the upper and lower anchoring members 20, 28. The intermediate anchoring member is in a vertical plane (not shown), parallel to the wall W that contains the upper anchoring member 28 so that the upper and intermediate anchoring members 28, 48, can both lie against a common vertical wall W. End brace member 64 may be provided to connect the upper and lower anchoring members 28, 48. Brace members 64 are useful to rigidify the structure during transit from a fabrication sight to an installation site and during installation.

Plural elongate lower bicycle support members 56 are connected to both the lower and intermediate anchoring members 28, 48, with the lower bicycle support members 56 being interleaved inbetween the upper bicycle support members 36. The support members 36 and 56 are spaced apart from one another to provide bicycle receiving gaps therebetween. Each of the lower bicycle support members 56 also includes a vertically extending portion 57 and a horizontally extending portion 58 connected by a curved portion 59.

Hangers or hooks 60 are mounted on at least some of the lower bicycle support members 56. Bicycles can be hung from the hangers 60 as in the manner of the hangers 40. Best results are achieved when the lower bicycle support hangers 60 also are at elevations above the floor that are no less than the length of the bicycles to be hung.

The support members 36, 56 can most conveniently be attached to the upper and lower anchoring members 20, 28, by welding or by fasteners such as internally threaded flanges and bolts (not shown). Hangers 40, 60 can be formed by welding short pieces of ½ inch steel rod to the support members. For added strength, a hole is drilled through at least one portion of the wall of a support member, and a hanger is formed by inserting a piece of the rod through the hole and then welding it in place. The hanger can be formed by welding on a straight piece of rod such that piece extend both upwardly and laterally from a support member. Alternatively, a curved piece of steel rod can be welded to the support member with a portion of the curved piece being positioned to provide an upwardly opening cradle suitable to at least partially receive and support the rim of a bicycle.

Figure 4:
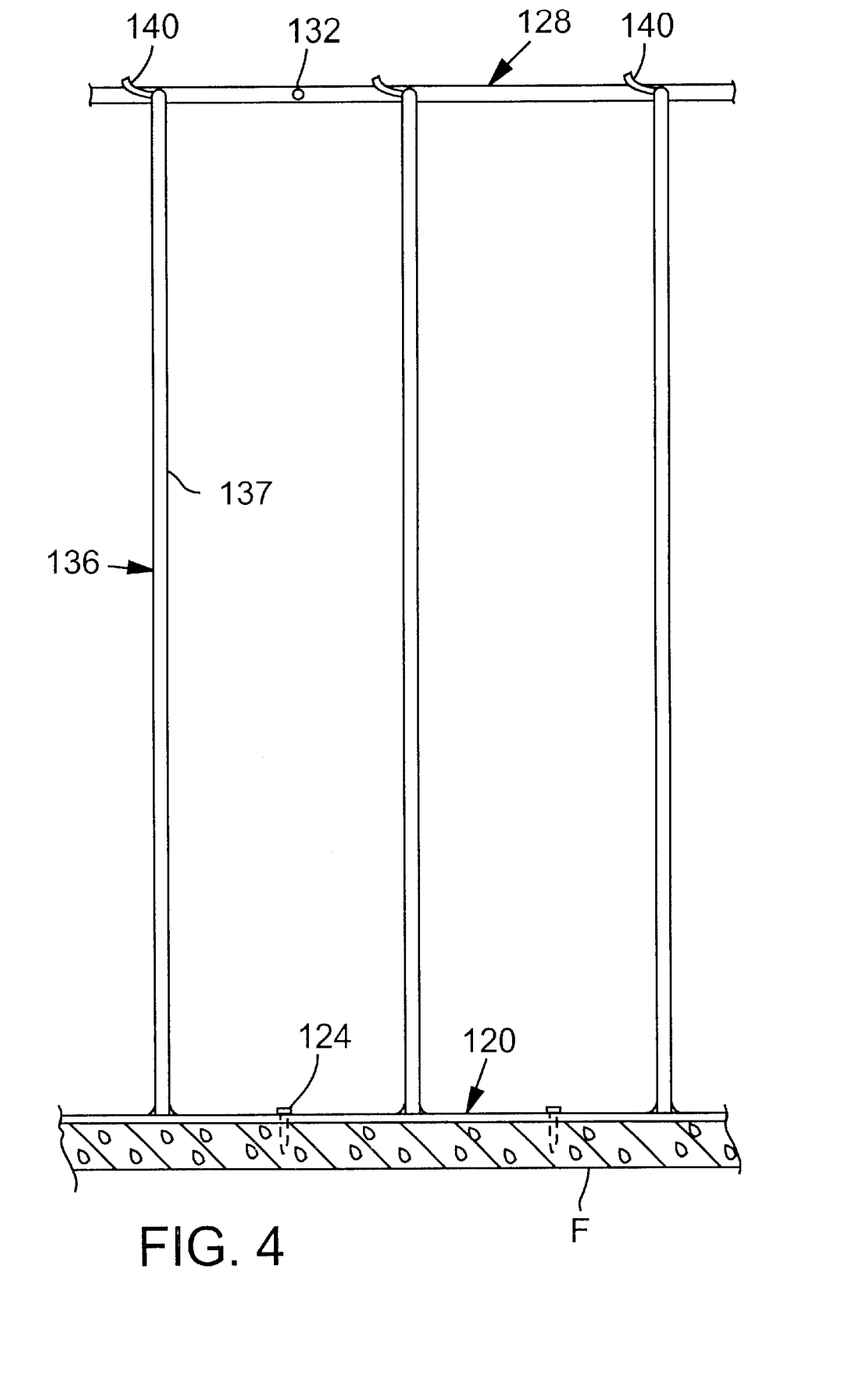
FIG. 4 is a front view of a second bicycle storage rack according to the present invention.
Figure 5:
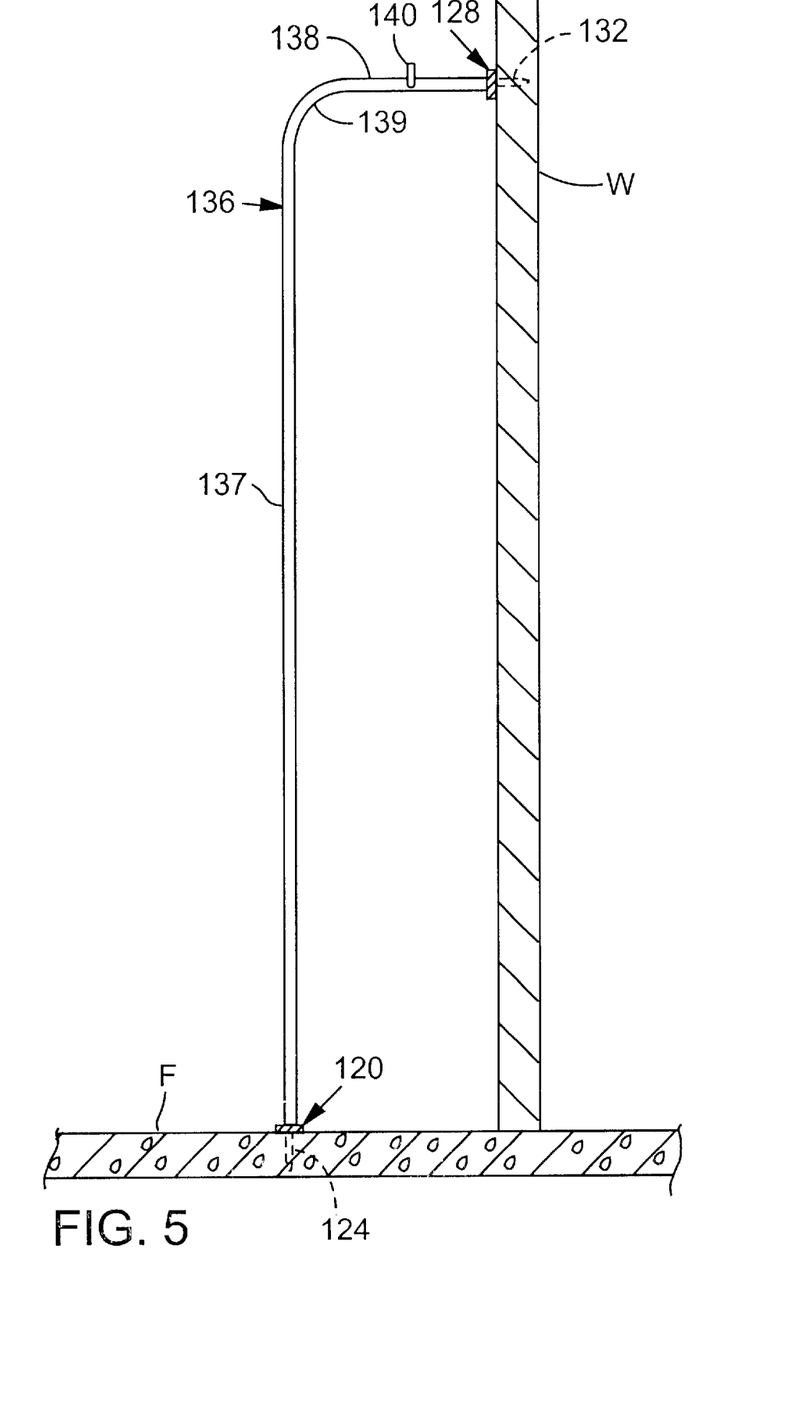
FIG. 5 is a right side view of the rack shown in FIG. 4.

The embodiment of FIGS. 4 and 5 is similar to that of FIGS. 1–3. Similar elements that appear in both embodiments are numbered the same, with the numbers in the embodiment of FIGS. 4 and 5 incremented by 100. It is an advantage of the embodiment shown in FIGS. 4 and 5 that it can be used in locations where a ceiling is too low to install a staggered level bicycle rack of the type shown in FIGS. 1–3.

Figure 6:
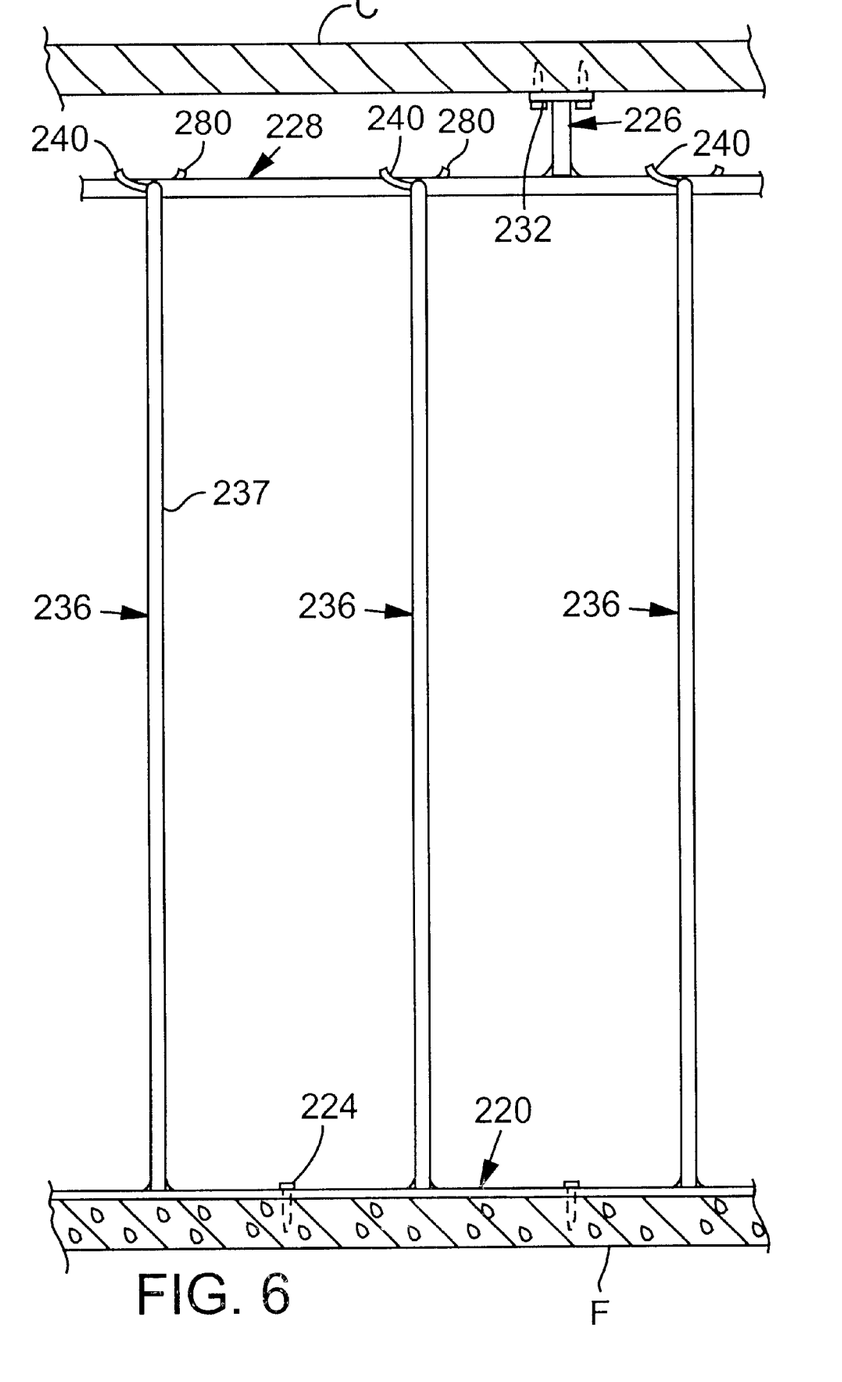
FIG. 6 is a front view of a third bicycle storage rack according to the present invention.
Figure 7:
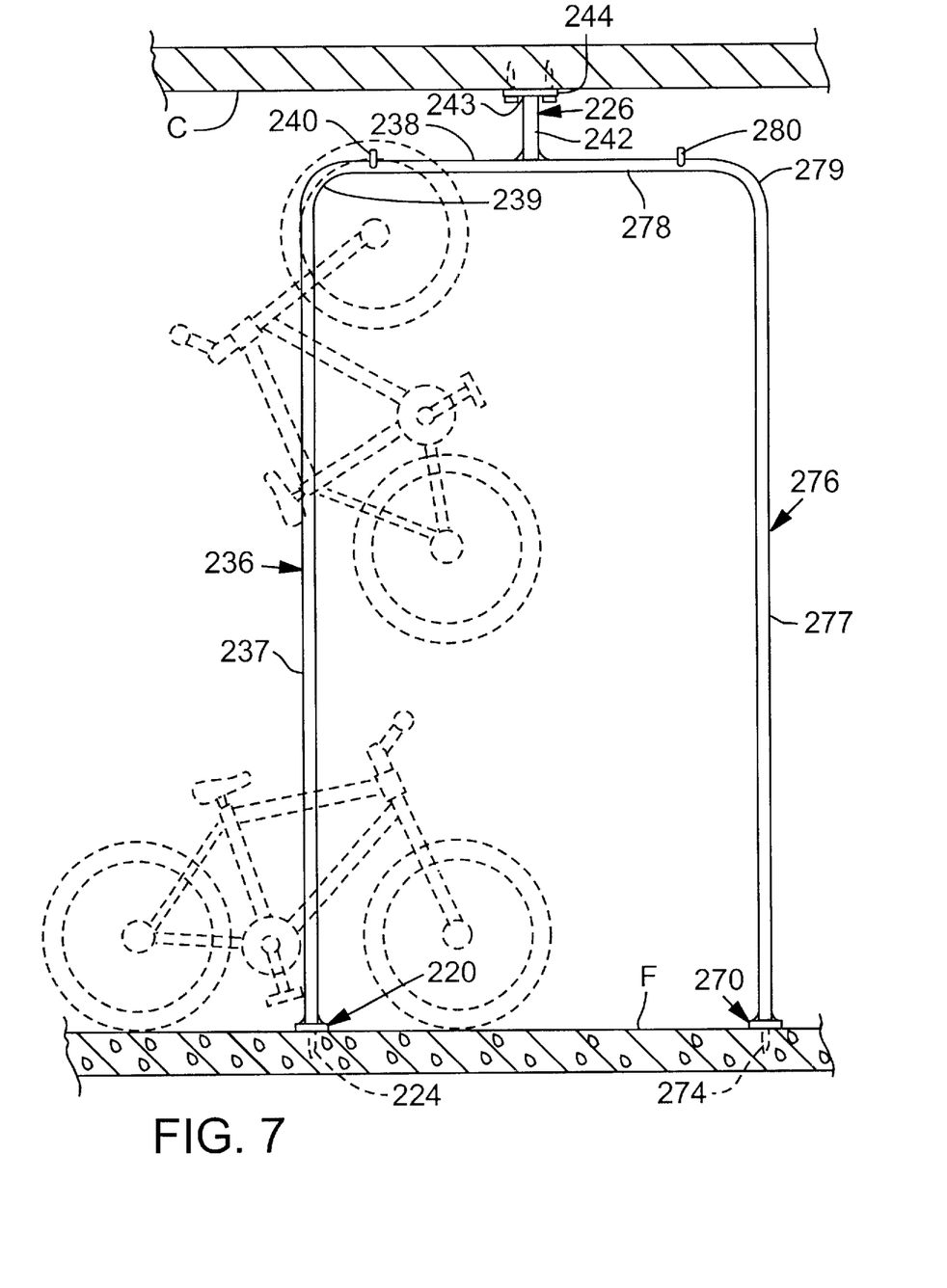
FIG. 7 is a right side view of the rack shown in FIG. 6.

The embodiment of FIGS. 6 and 7 is related to the previously described embodiments. Elements in FIGS. 6 and 7 that are similar to those appearing in the embodiment FIGS. 1–3 are numbered similarly with numbers incremented by 200. The device of FIGS. 6–7 is optimized to store bicycles in an open area, such as a large room where there may be insufficient wall space to mount a rack or where it is desired to mount racks both on a wall and in the center of the room. In this embodiment, the bicycle support members 236 are secured both to a lowering anchor member 220 and an upper anchor member 228. In the illustrated embodiment, the upper anchor member 228 is a steel tube, such as ¼×2×2 inch square tubing, that extends horizontally and generally parallel to the lower anchoring member 220. The upper anchoring member 228 is secured to a ceiling C by a fastener system 226 that includes plural vertically extending pipe sections 242. Each pipe section 242 has a threaded upper end 243 received in a threaded bore through a circular mounting flange 244. The flanges are connected to the ceiling C by lag screws 232, bolts or other fasteners or by other attachments.

When there is sufficient floor space, the capacity of such a rack can be doubled, as shown in FIGS. 6 and 7, by providing bicycle support members on both sides of the upper anchoring member 228. In particular, a substantially straight, horizontally extending second lowering anchoring member 270 extends substantially parallel to the first lower anchoring member 220. Both the lower anchoring members 220, 270 are laterally offset from the upper anchoring member 228 with the first and second horizontally extending anchor members 220, 270 being on opposite sides of the upper anchoring member 228. Fasteners 274 secure the second lower anchoring member 270 to the floor F. Plural elongate second bicycle support members 276 are connected to the second lower anchoring member 270 and the upper anchoring member 228. Each such support member in the illustrated embodiment has a substantially vertically extending portion 277 connected to the lower anchoring member 270 and a substantially horizontally extending portion 278 connected to the upper anchoring member 228 with a curved portion 279 between the vertically and horizontally extending portions 277, 278. The second bicycle support members 276 are spaced apart from one another to provide a series of bicycle support members in a row with bicycle receiving gaps between these second bicycle support members.

Bicycle hangers or hooks 280 are provided on some or all of the second support members 276. Advantageously these are at an elevation above the floor that is no less than the length of a bicycle to be hung so that when a bicycle is hung by a wheel rim as illustrated, the bicycle is elevated above the floor. FIGS. 7 illustrates how racks according to this invention can advantageously be used to store bicycles at multiple levels. If the ceiling is sufficiently elevated, a bicycle rack can be sufficiently extended vertically that bicycles can be stored in both vertical and horizontal orientations. In particular, a bicycle can be hung from one of the hooks near the top of the rack or it can be parked standing on its tires alongside one of the bicycle support members 236, 276. As needed, locks or cables can be used to secure bicycles to the bicycle support members.

Having illustrated and described the principles of my invention, it should be apparent to those skilled in the art that my invention may be modified in arrangement and detail without departing from such principles. For example, although the illustrated racks are unitary structures, it should be understood that similar racks could be built using plural shorter modules with fewer bicycle support members per module. For ease of installation several such modules could be installed end-toend along a wall or in the open area of a room to provide a rack of the desired capacity. I claim as my invention all such modifications as come within the true spirit and scope of the following claims.

What is claimed is:

1. A storage rack adapted to support a plurality of bicycles, the rack comprising:

a substantially straight horizontally extending lower anchoring member;

at least one fastener for securing the lower anchoring member to a floor;

a substantially straight horizontally extending upper anchoring member, the upper anchoring member extending substantially parallel to the lower anchoring member, being at an elevation above the lower anchoring member, and being laterally offset from the lower anchoring member;

at least one fastener for securing the upper anchoring member to a wall or ceiling;

a plurality of elongate bicycle support members, each support member being connected to both the lower and upper anchoring members, the support members being spaced apart from one another to provide a series of support members in a row with bicycle-receiving gaps therebetween;

a plurality of bicycle hangers, at least some of the bicycle support members supporting at least one of the hangers at an elevation above the floor;

a substantially straight horizontally extending intermediate anchoring member, the intermediate anchoring member extending substantially parallel to the upper anchoring member, being at an elevation between the elevations of the upper and lower anchoring members, and being in a vertical plane that contains the upper anchoring member;

a plurality of elongate lower bicycle support members, each lower bicycle support member being connected to both the lower and intermediate anchoring members, the lower bicycle support members being interleaved between upper bicycle support members and being spaced apart from each other and from the upper bicycle support members to provide bicycle-receiving gaps therebetween; and a plurality of lower bicycle hangers, at least some of the lower bicycle support members supporting at least one of the lower bicycle support hangers at an elevation above the floor.

2. The storage rack of claim 1 wherein each support member comprises a substantially vertically extending portion connected to the lower anchoring member and a substantially horizontally extending portion connected to one of the upper anchoring member and the intermediate anchoring member.

3. A storage rack adapted to support a plurality of bicycles, the rack comprising:

a substantially straight horizontally extending first lower anchoring member;

at least one fastener for securing the first lower anchoring member to a floor;

a substantially straight horizontally extending upper anchoring member, the upper anchoring member extending substantially parallel to the first lower anchoring member, being at an elevation above the first lower anchoring member, and being laterally offset from the first lower anchoring member;

at least one fastener for securing the upper anchoring member to a wall or ceiling;

a plurality of elongate bicycle support members, each support member being connected to both the lower and upper anchoring members, the support members being spaced apart from one another to provide a series of support members in a row with bicycle-receiving gaps therebetween;

a plurality of bicycle hangers, at least some of the bicycle support members supporting at least one of the hangers at an elevation above the floor;

a substantially straight, horizontally extending second lower anchoring member extending substantially parallel to the first lower anchoring member and being laterally offset from the upper anchoring member;

at least one fastener for securing the second lower anchoring member to the floor;

a plurality of elongate second bicycle support members, each second bicycle support member being connected to both the second lower anchoring member and the upper anchoring member, the second bicycle support members being spaced apart from one another to provide a series of second bicycle support members in a row with bicycle receiving gaps between the second bicycle support members;

a plurality of second bicycle hangers, at least some of the second bicycle support members supporting at least one of the second bicycle hangers at an elevation above the floor.

4. The storage rack of claim 3 wherein each support member comprises a substantially vertically extending portion connected to one of the lower anchoring members and a substantially horizontally extending portion connected to the upper anchoring member.

5. The storage rack of claim 3 wherein the first and second horizontally extending lower anchoring members are laterally offset in opposite directions from the upper anchoring member.

* * * * *